United States Patent
Chong, Jr.

(10) Patent No.: US 6,684,274 B1
(45) Date of Patent: Jan. 27, 2004

(54) HOST BUS ADAPTER BASED SCALABLE PERFORMANCE STORAGE ARCHITECTURE

(75) Inventor: Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/436,978

(22) Filed: Nov. 9, 1999

(51) Int. Cl.$^7$ .............................................. G06F 13/14
(52) U.S. Cl. ........................ 710/56; 709/213; 370/241; 710/10
(58) Field of Search ..................... 710/10, 56; 709/213; 370/241

(56) References Cited

U.S. PATENT DOCUMENTS

| | | | |
|---|---|---|---|
| 5,113,500 A | | 5/1992 | Talbott et al. |
| 5,649,109 A | * | 7/1997 | Griesmer et al. ........... 370/241 |
| 5,664,145 A | | 9/1997 | Apperley et al. |
| 5,805,821 A | * | 9/1998 | Saxena et al. .............. 709/213 |
| 5,896,492 A | | 4/1999 | Chong, Jr. |
| 6,397,267 B1 | | 5/2002 | Chong, Jr. |
| 6,604,155 B1 | * | 8/2003 | Chong, Jr. .................... 710/56 |

OTHER PUBLICATIONS 10 pgs. of information re: RAID Technology, © 1997, 1998 by Advanced Computer & Network Corp.
Meggyesi, "Fibre Channel Overview," Aug. 1994, 9 pgs.

* cited by examiner

Primary Examiner—Kim Huynh
Assistant Examiner—Abdelmoniem Elamin
(74) Attorney, Agent, or Firm—Robert C. Kowert; Meyertons, Hood, Kivlin, Kowert & Goetzel, P.C.

(57) ABSTRACT

One embodiment of a storage controller is described including a controller memory, one or more central processing units (CPUs), and a host bus adapter all coupled to a controller bus. The one or more CPUs are configured to produce data routing information dependent upon a data transfer command which directs a transfer of data between a host computer and one or more storage devices. The host bus adapter includes a receive unit and a transmit unit adapted for coupling to a transmission medium. The host bus adapter receives the data routing information, and forwards data associated with the data transfer command from the receive unit to the transmit unit dependent upon the data routing information such that the data associated with the data transfer command is not conveyed upon the controller bus and is not stored within the controller memory. As a result, the data transfer mechanism does not rely upon availability of the controller bus and/or the one or more CPUs, allowing independent scalability of input/output operations per second (IOPS) and data transfer rate of a storage system including the storage controller. Embodiments of storage and computer systems including the storage controller are also described.

23 Claims, 10 Drawing Sheets

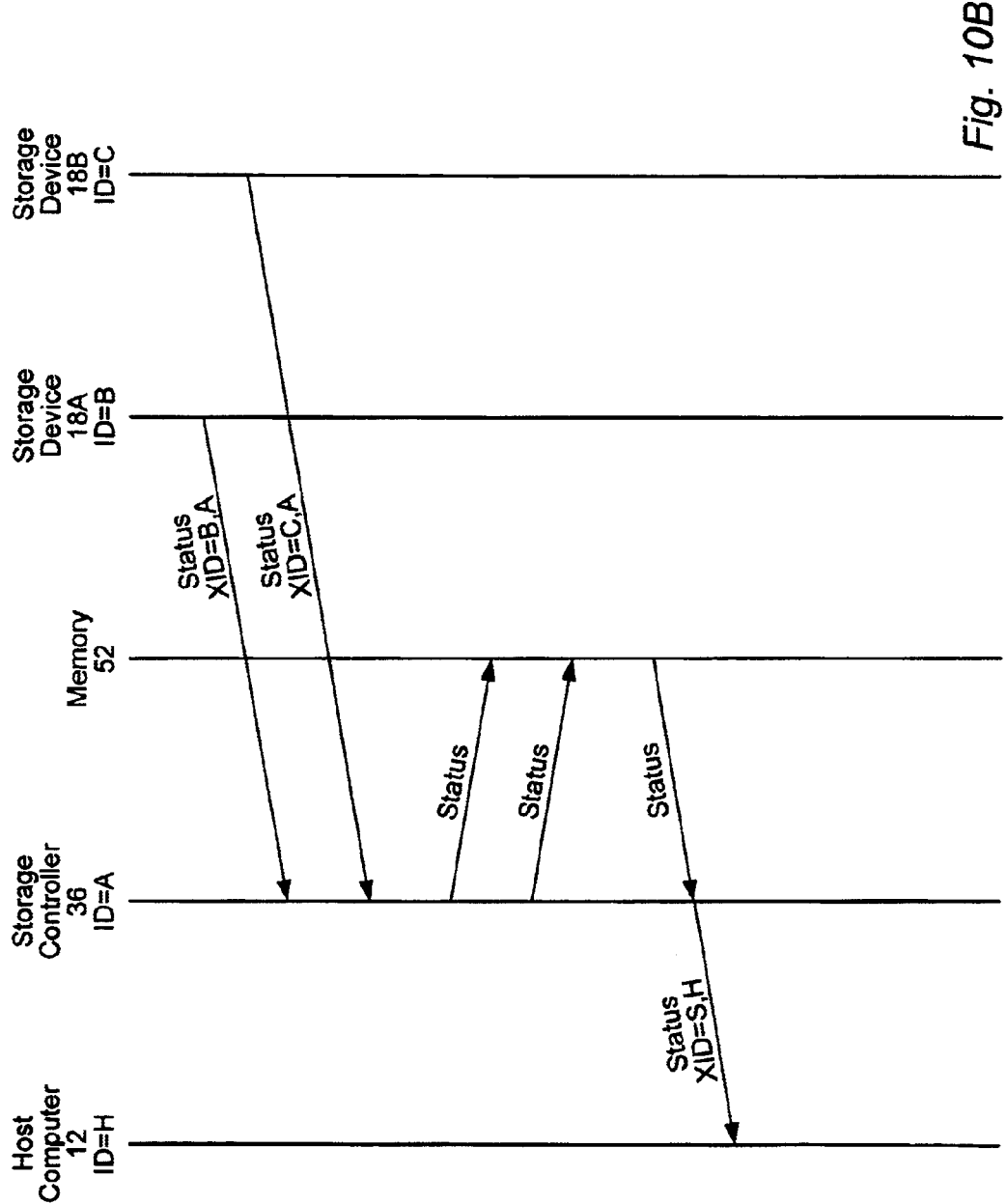

HOST BUS ADAPTER BASED SCALABLE PERFORMANCE STORAGE ARCHITECTURE

BACKGROUND OF THE INVENTION

1. Field of the Invention

This invention relates to data storage systems, and more particularly to data storage systems having a storage device controller interposed between a host computer and one or more data storage devices wherein the controller manages the storage of data within the one or more storage devices.

2. Description of the Related Art

Auxiliary storage devices such as magnetic or optical disk arrays are usually preferred for high-volume data storage. Many modern computer applications, such as high resolution video or graphic displays involving on-demand video servers, may heavily depend on the capacity of the host computer to perform in a data-intensive environment. In other words, necessity for external storage of data in relatively slower auxiliary data storage devices demands that the host computer system accomplish requisite data transfers at a rate that does not severely restrict the utility of the application that necessitated high-volume data transfers. Due to the speed differential between a host processor and an external storage device, a storage controller is almost invariably employed to manage data transfers to/from the host and from/to the storage device.

The purpose of a storage controller is to manage the storage for the host processor, leaving the higher speed host processor to perform other tasks during the time the storage controller accomplishes the requested data transfer to/from the external storage. The host generally performs simple data operations such as data reads and data writes. It is the duty of the storage controller to manage storage redundancy, hardware failure recovery, and volume organization for the data in the auxiliary storage. Redundant array of independent disks (RAID) algorithms are often used to manage data storage among a number of disk drives.

FIG. 1 is a diagram of a conventional computer system 10 including a host computer 12 coupled to a storage controller 14 by an interconnect link 16, and two storage devices 18A–18B coupled to storage controller 14 by respective interconnect links 20A and 20B. Each storage device 18 may be, for example, a disk drive array or a tape drive. Links 16 and 20A–20B may include suitable interfaces for I/O data transfers (e.g., Fibre Channel, small computer system interface or SCSI, etc.) As evident in FIG. 1, all of the information involved in data transfers between host computer 12 and storage devices 18A–18B passes through storage controller 14. Storage controller 14 receives command, status, and data packets during the data transfer.

FIG. 2 is a diagram illustrating an exemplary flow of control and data packets during a data read operation initiated by host computer 12 of FIG. 1. Links 16 and 20A–20B in FIG. 1 may be Fibre Channel links, and the data transfer protocol of FIGS. 1 and 2 may be the Fibre Channel protocol. Referring to FIGS. 1 and 2 together, host computer 12 issues a read command packet identifying storage controller 14 as its destination (XID=H,A) via link 16. Storage controller 14 receives the read command and determines that two separate read operations are required to obtain the requested data; one from storage device 18A and the other from storage device 18B.

Storage controller 14 translates the read command from host computer 12 into two separate read commands, one read command for storage device 18A and the other read command for storage device 18B. Storage controller 14 transmits a first read command packet identifying storage device 18A as its destination (XID=A,B) via link 20A, and a second read command packet identifying storage device 18B as its destination (XID=A,C) via link 20B. Each read command packet instructs respective storage devices 18A–18B to access and provide data identified by the read command. Storage device 18A (ID=B) accesses the requested data and transmits a data packet followed by a status packet (XID=B,A) to storage controller 14 via link 20A. Storage device 18B (ID=C) accesses the requested data and transmits a data packet followed by a status packet (XID=C,A) to storage controller 14 via link 20B. Each status packet may indicate whether the corresponding read operation was successful (i.e. whether the data read was valid).

Storage controller 14 typically includes a memory unit, and temporarily stores data and status packets in the memory unit. Storage controller 14 then consolidates the data received from storage devices 18A–18B and processes the status packets received from storage devices 18A–18B to form a composite status. Storage controller 14 transmits the consolidated data followed by the composite status (XID=A,H) to host computer 12 via link 16, completing the read operation. In the event that the composite status indicates a read operation error, host computer 12 may ignore the consolidated data and initiate a new read operation. In general, the flow of packets depicted in FIG. 2 is typical of a two-party point-to-point interface protocol (e.g., the Fibre Channel protocol).

As indicated in FIG. 1, storage controller 14 includes multiple communication ports. In addition to the memory and the multiple communication ports, storage controller 14 also typically includes one or more central processing units (CPUs). The multiple communication ports and the CPUs may be coupled to a communication bus. The CPUs and the memory may be coupled to a common bus within storage controller 14, and the CPUs may access the memory via the bus.

Two parameters are commonly used to measure the performance of a storage system: (1) the number of input/output (I/O) operations per second (IOPS), and (2) the data transfer rate of the storage system. Generally, the rate of execution of I/O operations by a storage controller is governed by the type, speed and number of CPUs within the storage controller. The data transfer rate depends on the data transfer bandwidth of the storage controller. In computer system 10 described above, all of the data transferred between host computer 12 and storage devices 18A–18B is temporarily stored within the memory of storage controller 14, and thus travels through the bus of storage controller 14. As a result, the data transfer bandwidth of storage controller 14 is largely dependent upon the bandwidth of the bus of storage controller 14.

Current storage systems have restricted scalability because of the storage controllers having a relatively inflexible ratio of CPU to bandwidth capability. This is especially true if they are based on "off-the-shelf" microprocessors or computer systems. Usually the storage controller is designed to satisfy the majority of IOPS and data rate performance requirements with one implementation. This interdependence between IOPS and data transfer rate results in less efficient scalability of performance parameters. For example, in conventional storage controller architectures, an increase in data transfer rate may require both an increase in data transfer bandwidth and an increase in the number of CPUs residing within the controller.

It would thus be desirable to have a storage controller where control functionality (as measured by the IOPS parameter) is scalable independently of the data transfer bandwidth (which determines the data transfer rate), and vice versa. It may be further desirable to achieve independence in scalability without necessitating a change in the existing interface protocol managing the host-controller-storage interface.

SUMMARY OF THE INVENTION

One embodiment of a storage controller is described including a controller memory, one or more central processing units (CPUs), and a host bus adapter all coupled to a controller bus. The one or more CPUs are configured to produce data routing information dependent upon a data transfer command which directs a transfer of data between a host computer and one or more storage devices. The host bus adapter includes a receive unit and a transmit unit adapted for coupling to a transmission medium. The host bus adapter receives the data routing information, and forwards data associated with the data transfer command from the receive unit to the transmit unit dependent upon the data routing information such that the data associated with the data transfer command is not conveyed upon the controller bus and is not stored within the controller memory. As a result, the data transfer mechanism does not rely upon availability of the controller bus and/or the one or more CPUs, allowing independent scalability of input/output operations per second (IOPS) and data transfer rate of a storage system including the storage controller. Embodiments of storage and computer systems including the storage controller are also described.

The storage controller may receive the data transfer command via the receive unit of the host bus adapter, and may store the data transfer command within the controller memory. The controller memory may also store configuration information of the one or more storage devices. The configuration information may include, for example, redundant array of independent disks (RAID) configuration information of the one or more storage devices. The one or more CPUs may access the data transfer command and the configuration information within the controller memory in order to: (i) translate the data transfer command dependent upon the configuration information of the one or more storage devices, thereby producing one or more translated data transfer commands, and (ii) produce the data routing information. The one or more CPUs may forward the one or more translated data transfer commands to the host bus adapter, and the host bus adapter may transmit the one or more translated data transfer commands upon the transmission medium via the transmit unit.

The host bus adapter may store the data routing information within a host bus adapter memory. In one embodiment, the host bus adapter memory includes a first lookup table and a data buffer area, and the data routing information includes command identification information one or more pointers to different data buffers within the data buffer area. The command identification information uniquely identifies the data transfer command. The command identification information and the one or more pointers are stored within the first lookup table. The host bus adapter stores the data associated with the data transfer command within the data buffers using the pointers. When all of the data associated with the data transfer command has been received by the host bus adapter, the host bus adapter forwards the data associated with the data transfer command from the host bus adapter memory to the transmit unit, and the transmit unit transmits the data upon the transmission medium. As a result, the host bus adapter forwards data associated with the data transfer command from the receive unit to the transmit unit dependent upon the data routing information such that the data associated with the data transfer command is not conveyed upon the controller bus and is not stored within the controller memory.

In an alternate embodiment, the host bus adapter memory includes a second lookup table, and the data routing information includes target header information and corresponding substitute header information. The target header information includes at least a portion of a header field of an expected data frame, and the substitute header information includes header information to be substituted by the receive unit for the header information of the expected data frame. The target header information and the corresponding substitute header information are stored within the second lookup table. The host bus adapter compares header information of a received data frame to the target header information within the lookup table. If the header information of the received data frame matches the target header information, the host bus adapter replaces the header information of the received data frame with the substitute header information corresponding to the target header information, and forwards the received data frame from the receive unit to the transmit unit. The transmit unit transmits the received data frame upon the transmission medium. As a result, the host bus adapter forwards data associated with the data transfer command from the receive unit to the transmit unit dependent upon the data routing information such that the data associated with the data transfer command is not conveyed upon the controller bus and is not stored within the controller memory.

One embodiment of a storage system is described including one or more storage devices coupled to the storage controller described above. The one or more storage devices may include multiple disk drives, the storage controller may manage the one or more storage devices as a RAID array, and the configuration information of the one or more storage devices may include RAID array configuration information of the one or more storage devices. The one or more CPUs translate the data transfer command as described above, producing the one or more translated data transfer commands. The host bus adapter transmits the one or more translated data transfer commands to the one or more storage devices (e.g., via the transmit unit and a transmission medium).

The one or more CPUs also produce data routing information dependent upon the data transfer command and the configuration information of the one or more storage devices. The host bus adapter receives the data routing information and stores the data routing information within the host bus adapter memory. The host bus adapter forwards data associated with the data transfer command from the receive unit to the transmit unit dependent upon the data routing information and independent of the controller bus and the controller memory (i.e., such that the data associated with the data transfer command is not conveyed upon the controller bus and is not stored within the controller memory).

One embodiment of a computer system includes a host computer, the one or more storage devices, a transmission medium coupled to the host computer and to the one or more storage devices, and the storage controller described above, wherein the receive and transmit units of the host bus adapter of the storage controller are coupled to the transmission medium. As described above, the host bus adapter forwards data associated with the data transfer command from the receive unit to the transmit unit dependent upon the data routing information and independent of the controller bus and the controller memory.

One method for conveying data within a storage system includes providing a storage controller comprising a host bus adapter and a controller memory coupled to a controller bus, wherein the host bus adapter comprises a receive unit, a transmit unit, and a host bus adapter memory. The receive and transmit units of the host bus adapter are coupled to a host computer and at least one storage device. A data transfer command is received from the host computer. Data routing information is generated within the storage controller dependent upon the data transfer command and stored within the host bus adapter memory. Data associated with the data transfer command is forwarded from the receive unit to the transmit unit of the host bus adapter dependent upon the data routing information and independent of the controller bus and the controller memory.

A second method for conveying data is intended for use in a storage system including a storage controller having a command processor (e.g., multiple CPUs), and a host adapter coupled to a controller bus. The method includes the host adapter receiving a data transfer command from a host computer coupled to the host adapter. The host adapter conveys the data transfer command to the command processor via the controller bus. The command processor generates data routing information dependent upon the data transfer command, and conveys the data routing information to the host adapter via the controller bus. The host adapter receives data for the data transfer command from one or more storage devices, and forwards the data to the host computer such that the data is conveyed from the one or more storage devices to the host computer without being conveyed on the controller bus or to the command processor.

A third method for conveying data is intended for use within the storage system described above. The host adapter receives a data transfer command from a host computer coupled to the host adapter. The host adapter conveys the data transfer command to the command processor via the controller bus. The command processor translates the data transfer command into one or more device data transfer commands, and conveys the device data transfer commands to the host adapter via the controller bus. The host adapter forwards the device data transfer commands to one or more storage devices. The host adapter receives data in response to the device data transfer commands and forwards the data to the host computer such that the data is conveyed from the one or more storage devices to the host computer without being conveyed on the controller bus or to the command processor.

BRIEF DESCRIPTION OF THE DRAWINGS

Other objects and advantages of the invention will become apparent upon reading the following detailed description and upon reference to the accompanying drawings in which:

FIGS. 10A–B illustrate an exemplary flow of control and data packets during a data read operation initiated by the host computer of the computer system of FIG. 3 or FIG. 4.

Figure 1:
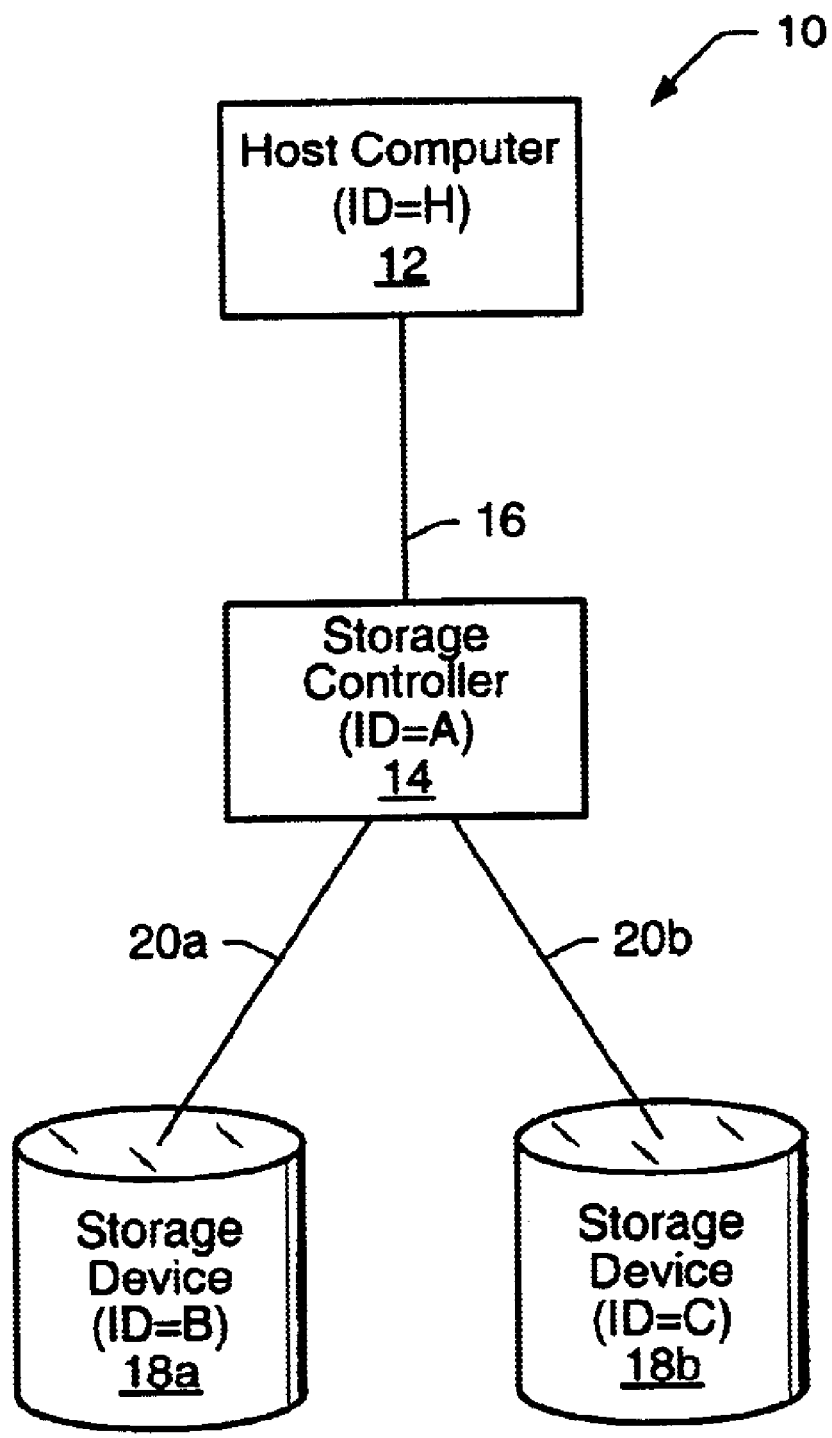
FIG. 1 is a diagram of a conventional computer system including a host computer coupled to a storage controller and two storage devices coupled to the storage controller.
Figure 2:
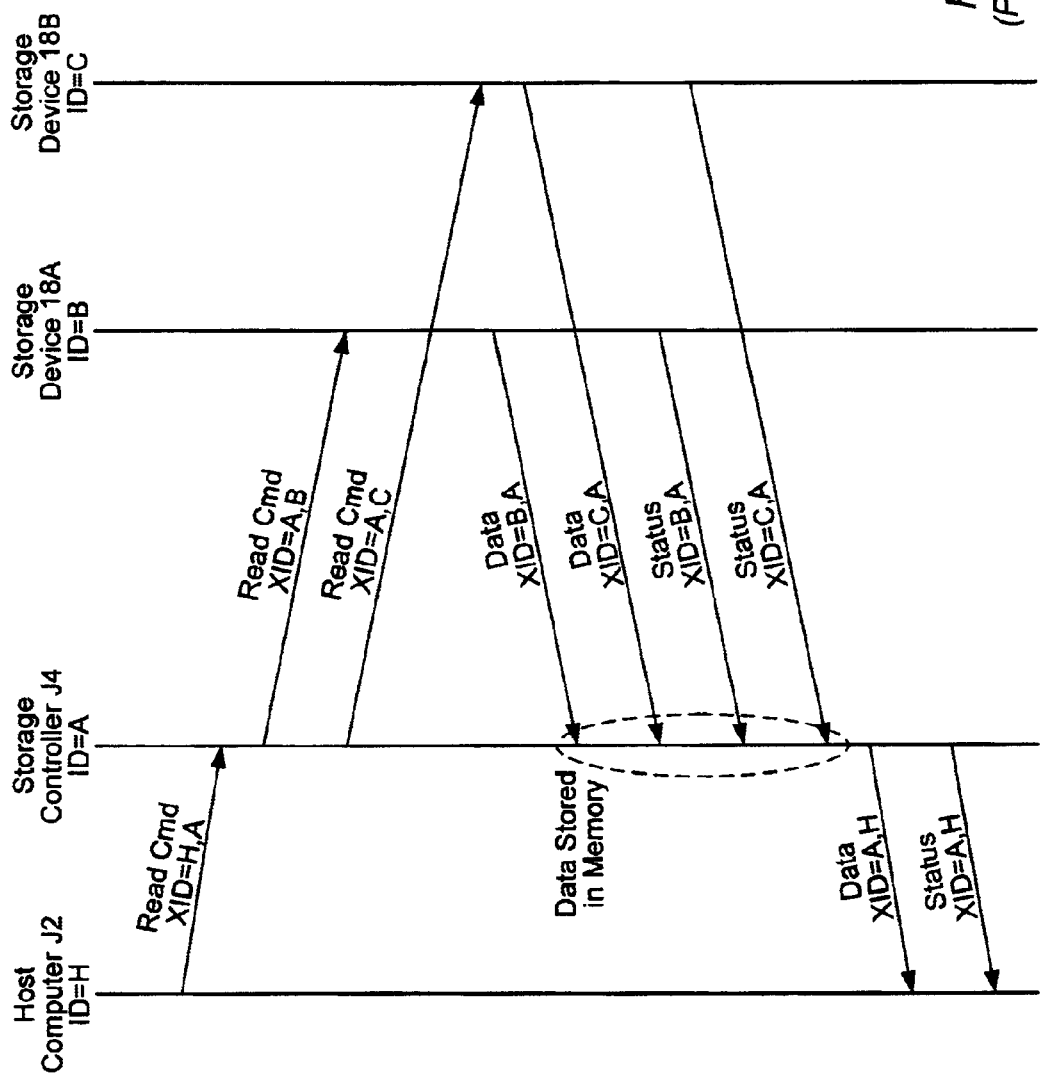
FIG. 2 is a diagram illustrating an exemplary flow of control and data packets during a data read operation initiated by the host computer of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
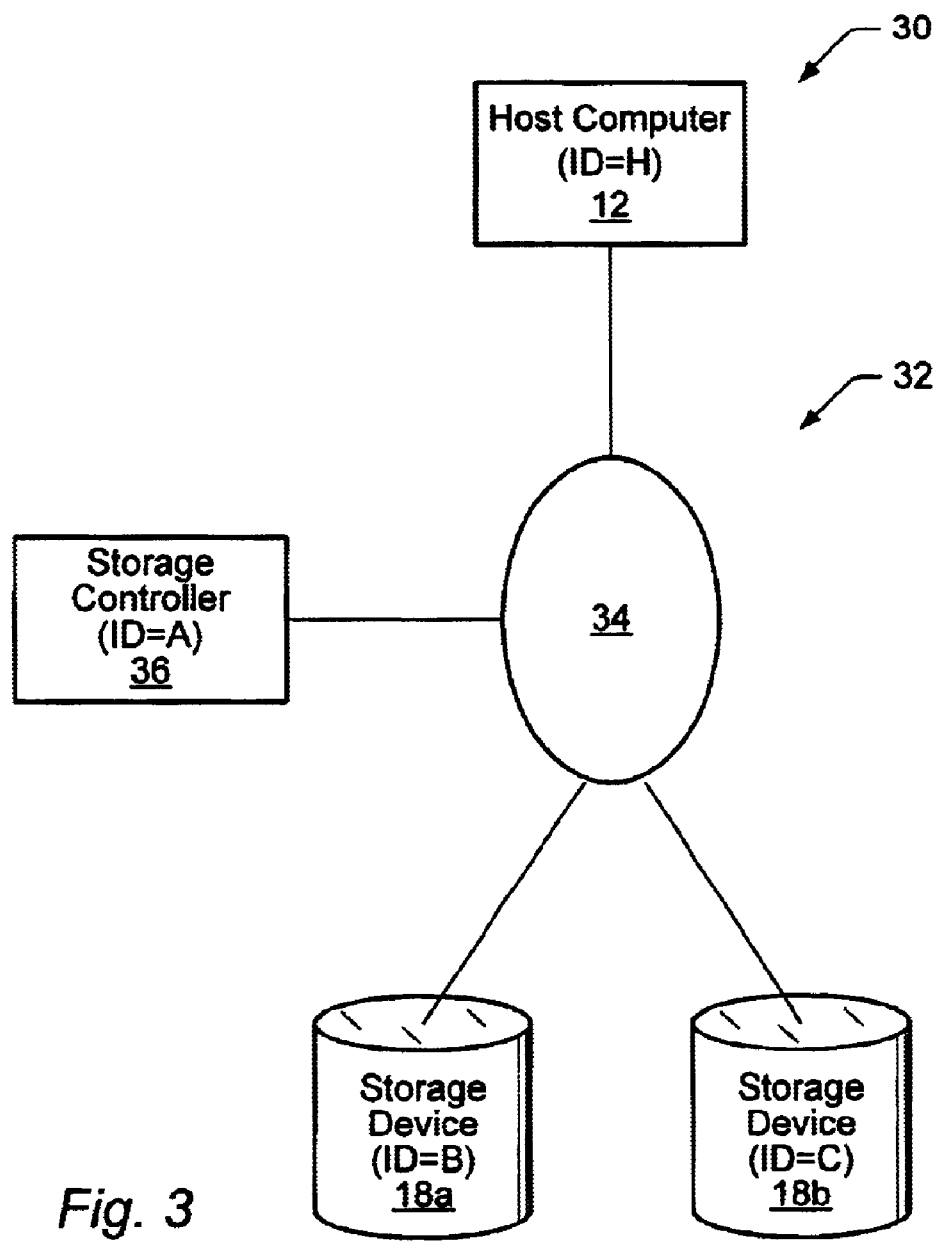
FIG. 3 is one embodiment of a first computer system including the host computer coupled to a first storage system, wherein the first storage system includes a storage controller and the two storage devices coupled to a transmission medium configured as a loop (e.g., a Fibre Channel arbitrated loop)

FIG. 3 is one embodiment of a first computer system 30 including host computer 12 coupled to a storage system 32. Storage system 32 includes a storage controller 36 and storage devices 18A–18B. Host computer 12, storage controller 36, and storage devices 18A–18B are all coupled to a transmission medium configured as a loop 34 (e.g., a Fibre Channel arbitrated loop). Host computer 12, storage controller 36, and storage devices 18A–18B communicate via loop 34. As will be described in detail below, storage controller 36 employs a non-standard host bus adapter modified in order to separate data and control paths within storage controller 36. As a result, computer system 30 achieves separation of data and control paths between host computer 12 and storage devices 18A–18B, thus allowing independent scalability of storage system IOPS and data transfer rate. It is noted that communications via loop 34 do not violate a two party protocol such as the Fibre Channel protocol.

Figure 4:
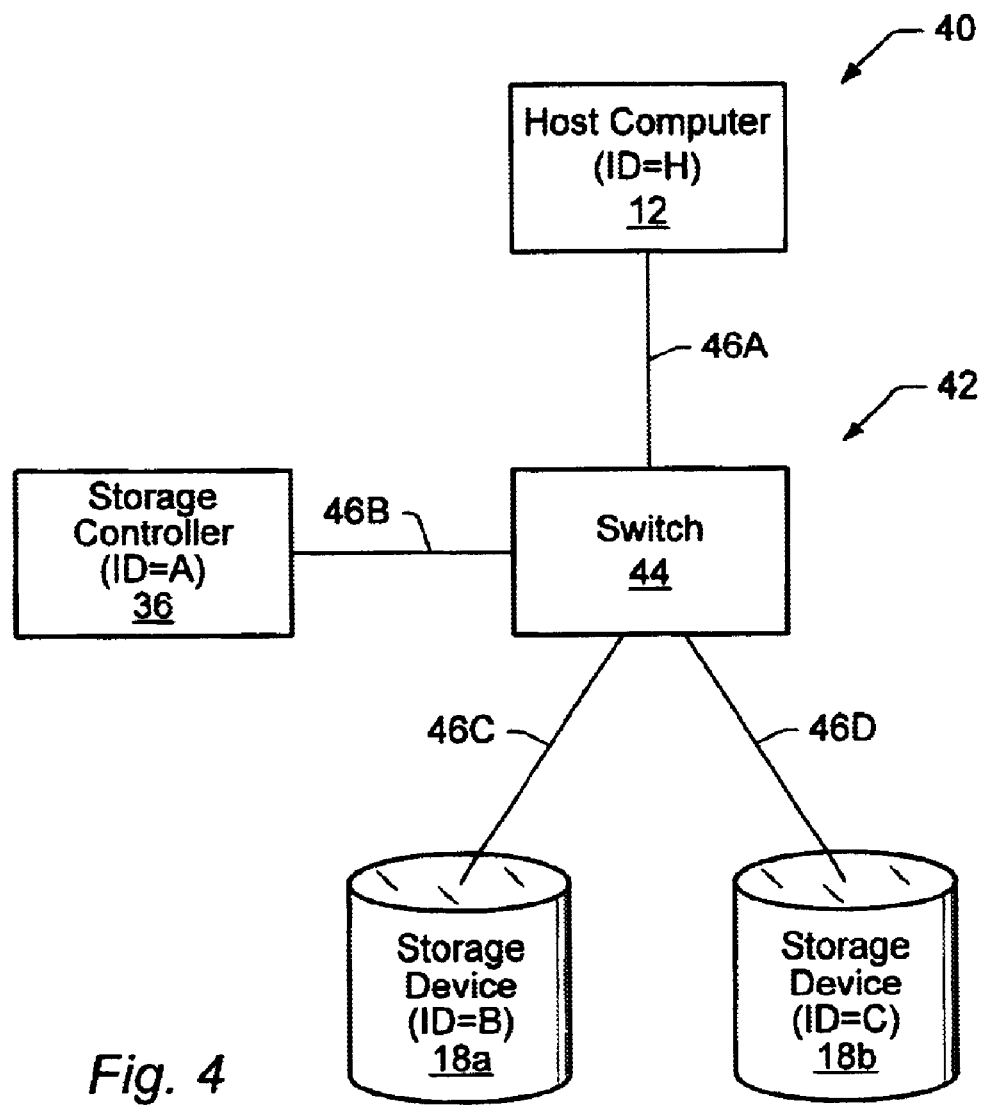
FIG. 4 is a diagram of a one embodiment of a second computer system including the host computer coupled to a second storage system, wherein the second storage system includes the storage controller of FIG. 3, the two storage devices, and a switch, and wherein the host computer, the storage controller, and the two storage devices are coupled to the switch.

FIG. 4 is a diagram of a one embodiment of a second computer system 40 including host computer 12 coupled to a storage system 42. Storage system 42 includes storage controller 36, storage devices 18A–18B, and a switch 44. Host computer 12 is coupled to switch 44 via an interconnect link 46A. Storage controller 36 is coupled to switch 44 via an interconnect link 46B. Storage devices 18A–18B are coupled to switch 44 via respective interconnect links 46C–46D. Interconnect links 46A–46D include at least one transmission medium, and preferably include a pair of unidirectional transmission media, each of the pair of transmission media providing communication in a direction opposite the other. As described above, storage controller 36 employs a modified host bus adapter in order to separate data and control paths within storage controller 36. As a result, computer system 40 achieves separation of data and control paths between host computer 12 and storage devices 18A–18B, thus allowing independent scalability of storage system IOPS and data transfer rate.

Switch 44 is a conventional switch, and merely routes received packets within storage system 42. Switch 44 does not have an address, and packets are not addressed to switch 44.

Physical interconnect and signaling methods employed within computer system 30 (FIG. 3) and computer system 40 (FIG. 4) preferably comply with the Fibre Channel standard. Alternately, any physical interconnect and signaling methods may be employed, including small computer system interface (SCSI) methods, asynchronous transfer mode (ATM) methods, and transmission control protocol/internet protocol (TCP/IP) methods.

Figure 5:
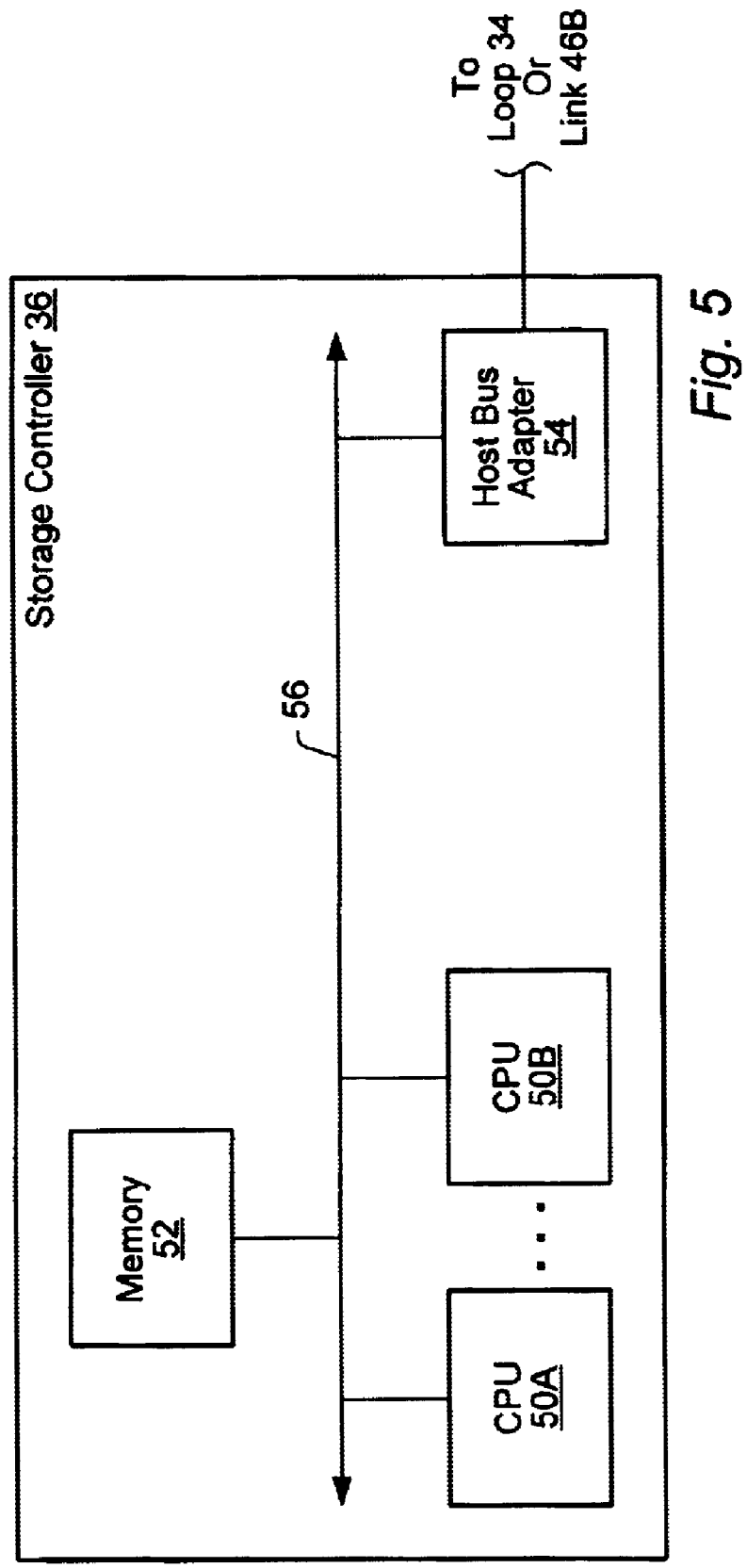
FIG. 5 is a block diagram of one embodiment of the storage controller of FIGS. 3 and 4, wherein the storage controller includes a non-standard host bus adapter modified in order to separate data and control paths within the storage controller.

FIG. 5 is a block diagram of one embodiment of storage controller 36 of FIGS. 3 and 4. In the embodiment of FIG. 5, storage controller 36 includes a first central processing unit (CPU) 50A, a second CPU 50B, a memory 52, and a host bus adapter 54 all coupled to a controller bus 56. Host bus adapter 54 is coupled to loop 34 (FIG. 3) or link 46B (FIG. 4). Host bus adapter 54 is a non-standard host bus adapter modified in order to separate data and control paths within storage controller 36.

Each storage device 18 includes one or more storage devices, and preferably includes multiple storage disks organized as a disk array (e.g., a redundant array of independent disks or RAID). Each storage device 18 may be, for example, a storage subsystem with multiple disk drives and a resident RAID controller. There are currently several different RAID levels each offering different degrees of performance and fault tolerance. For example, RAID level 0 spreads out blocks of data across multiple disks (i.e., provides data striping). However, RAID level 0 provides no data redundancy. RAID level 0 offers relatively high performance, but no fault tolerance. RAID level 1 provides disk mirroring and 100 percent data redundancy. It is noted that a combination of RAID levels (e.g., RAID levels 0 and 1) may also be implemented. Each storage device 18 may also include other types of discrete physical devices using magnetic or other types of storage media (e.g., CD ROM drives, magnetic tape drives, optical video disk drives, etc.).

In one embodiment, storage controller 36 implements one or more RAID algorithms to manage data storage and/or data recovery operations. In an alternative embodiment, each storage device 18 includes a resident RAID controller, and storage controller 36 simply issues data transfer commands to storage devices 18A–18B without specifying RAID levels for data storage.

Host bus adapter 54 receives a data transfer command (i.e., a data read or write command) from host computer 12 via a control path including loop 34 (FIG. 3) or link 46B (FIG. 4). Host bus adapter 54 may store the data transfer command within memory 52 and alert CPU 50A and/or CPU 50B to the presence of the data transfer command within memory 52. Alternately, host bus adapter 54 may alert CPU 50A and/or CPU 50B to the presence of the received data transfer command, and CPU 50A and/or CPU 50B may store the data transfer command within memory 52. In either case, the data transfer command is stored within memory 52, and controller bus 56 and memory 52 are part of the control path conveying control information between host computer 12 and storage devices 18A–18B.

CPU 50A and/or CPU 50B accesses the data transfer command within memory 52 and translates the data transfer command received from host computer 12 dependent upon: (i) the data transfer command, and (ii) configuration information of storage devices 18A–18B (e.g., a RAID configuration of storage devices 18A–18B) stored within memory 52. CPU 50A and/or CPU 50B thereby produces one or more translated data transfer commands. The one or more translated data transfer commands include commands directed to storage device 18A and/or storage device 18B. The one or more translated data transfer commands may also include appropriate commands for the RAID configuration of storage devices 18A–18B.

For example, a group of RAID levels including RAID levels 1 and 5 may have been identified when a given storage volume was established within storage system 32. During translation of a write command received from host computer 12, CPU 50A and/or CPU 50B may dynamically select one or more RAID levels from the group dependent upon on, for example, the type of write command and/or prior storage history for that type of write command. CPU 50A and/or CPU 50B may determine, for example, that one data block is to be stored within storage device 18A and/or storage device 18B according to RAID level 1, whereas another data bock is to be stored according to RAID level 5.

CPU 50A and/or CPU 50B provides the one or more translated data transfer commands to host adapter 54 via controller bus 56. Host adapter 54 routes the translated data transfer commands to storage device 18A and/or storage device 18B as appropriate. In computer system 30 of FIG. 3, host bus adapter 54 routes the translated data transfer commands to storage device 18A and/or storage device 18B via loop 34. In computer system 40 of FIG. 4, host bus adapter 54 routes the translated data transfer commands to switch 44 via link 46B. Switch 44 routes the translated data transfer commands to storage device 18A and/or storage device 18B as appropriate via respective links 46C and 46D.

As will be described in more detail below, CPU 50A and/or CPU 50B also produces data routing information for the data transferred between host computer 12 and storage device 18A and/or storage device 18B dependent upon: (i) the data transfer command, and (ii) the configuration information of storage devices 18A–18B (e.g., a RAID configuration of storage devices 18A–18B) stored within memory 52. CPU 50A and/or CPU 50B provides the data routing information to host adapter 54 via controller bus 56. Host bus adapter 54 stores the data routing information, and uses the data routing information to route the data transferred between host computer 12 and storage device 18A and/or storage device 18B as a result of the data transfer command such that the data is not conveyed upon controller bus 56 or stored within memory 52 of storage controller 36. As a result, controller bus 56 and memory 52 are not part of a path conveying data between host computer 12 and storage devices 18A–18B.

Removing controller bus 56 and memory 52 of storage controller 36 from the data path between host computer 12 and storage devices 18A–18B allows independent scalability of IOPS and the data transfer rates of storage system 32 (FIG. 3) and storage system 42 (FIG. 4). For example, the rate at which input/output operations are executed within storage system 32 (FIG. 3) and storage system 42 (FIG. 4) may be increased by increasing the number of CPUs 50 within storage controller 36. The data transfer rates of storage system 32 (FIG. 3) and storage system 42 (FIG. 4) may be increased by increasing the rates at which data may be transferred upon (i.e., bandwidth of) loop 34 and/or the number of loops 34 (FIG. 3), or by increasing the bandwidths of links 46 and/or the number of links 46 (FIG. 4).

Figure 6:
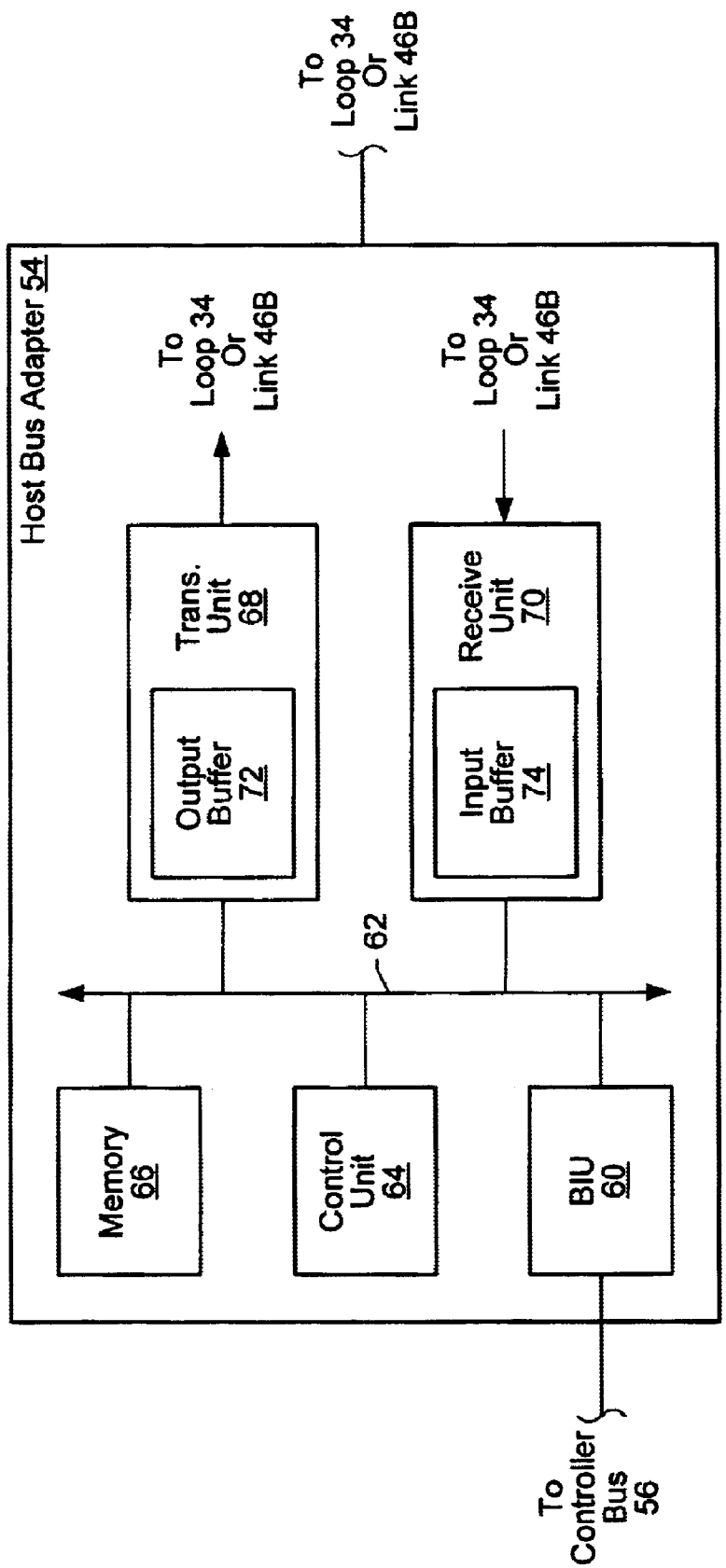
FIG. 6 is a block diagram of one embodiment of the host bus adapter of FIG. 5.

FIG. 6 is a block diagram of one embodiment of host bus adapter 54 of FIG. 5. In the embodiment of FIG. 6, host bus adapter 54 includes a bus interface unit (BIU) 60 coupled between controller bus 56 and an adapter bus 62. Host bus adapter 54 also includes a control unit 64, a memory 66, a transmit unit 68, and a receive unit 70 all coupled to adapter bus 62. Transmit unit 68 and receive unit 70 are coupled to loop 34 (FIG. 3) or link 46B (FIG. 4). Transmit unit 68 includes an output buffer 72, and receive unit 70 includes an input buffer 74.

BIU 60 handles all communications between host bus adapter 54 and functional elements of storage controller 36 coupled to controller bus 56 (e.g., CPUs 50A–50B and memory 52). Control unit 64 controls the operations of BIU 60, transmit unit 68, and receive unit 70. Transmit unit 68 transmits data upon loop 34 (FIG. 3) or link 46B (FIG. 4), and receive unit 70 receives data via loop 34 (FIG. 3) or link 46B (FIG. 4). Control unit 64 may execute instructions stored within memory 66. Memory 66 may also be used to temporarily store command, data, and/or status information associated with data transfer commands originating from host computer 12.

Figure 7A:
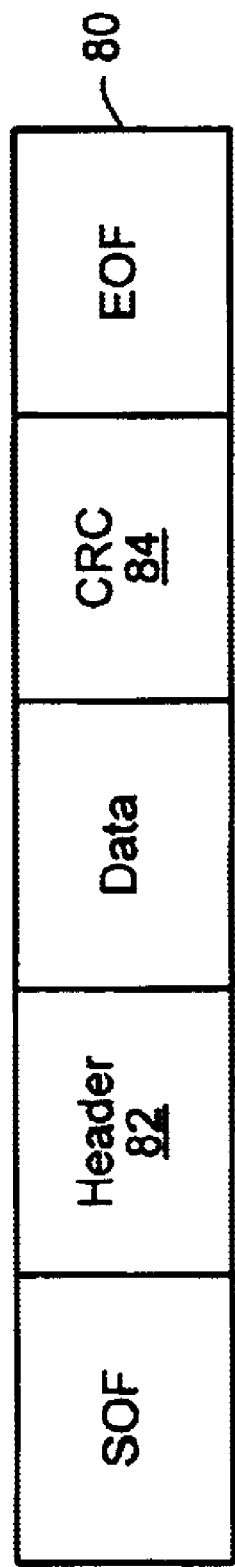
FIG. 7A is a diagram of an exemplary frame for conveying packets according to a data transfer standard (e.g., the Fibre Channel standard), wherein the frame includes a header field.

FIG. 7A is a diagram of an exemplary frame 80 for conveying packets according to a data transfer standard (e.g., the Fibre Channel standard). A packet is transmitted as one or more frames under the Fibre Channel standard. Frame 80 includes a start of frame (SOF) field, a header field 82, a data field, a cyclic redundancy check (CRC) field 84, and an end of frame (EOF) field. CRC field 84 includes a mathematical value used for error detection derived using the information contained within the SOF field, header field 82, and the data field.

Figure 7B:
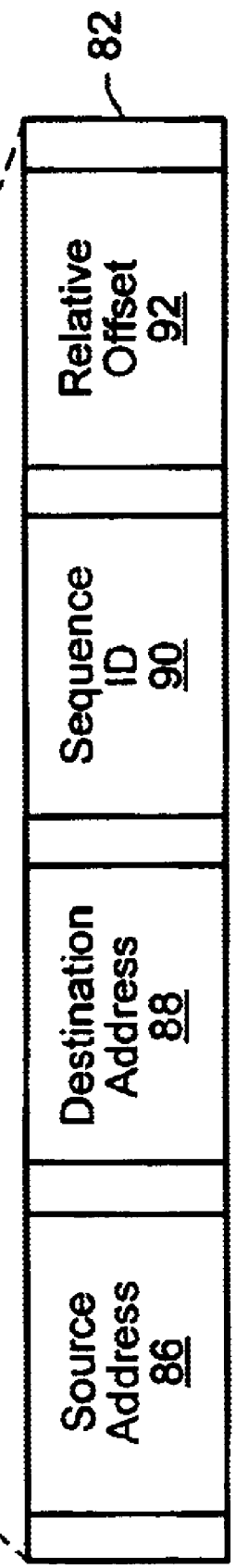
FIG. 7B is a diagram of an exemplary header field of the frame of FIG. 7A.

FIG. 7B is a diagram of an exemplary header field 82 of frame 80 of FIG. 7A. Header field 82 includes a source address field 86, a destination address field 88, a sequence identification (ID) field 90, and a relative offset field 92. Source address field 86 contains the address of the device which generated frame 80 (i.e., the source device), wherein the address of the source device is a value which uniquely identifies the source device. Destination address field 88 contains the address of the device which is the intended receiver of frame 80 (i.e., the destination device), wherein the address of the destination device is a value which uniquely identifies the destination device. In the Fibre Channel standard, a "sequence" is composed of one or more frames containing "payload" specific to a particular protocol (e.g., the small computer system interface or SCSI protocol). Sequence ID field 90 identifies each sequence between an exchange originator and responder with a unique value. Relative offset field 92 contains a value indicating an offset associated with the data contained within the data field of frame 80 relative to a base address of a data buffer associated with the data transfer operation.

Host bus adapter 54 may route data between host computer 12 and storage device 18A and/or storage device 18B a number of ways such that the data is not conveyed upon controller bus 56 or stored within memory 52 of storage controller 36. For example, under the Fibre Channel standard, a data transfer command may result in one or more sequences conveying data between host computer 12 and storage device 18A and/or storage device 18B, wherein each sequence includes one or more frames 80 of FIGS. 7A–7B.

It is noted that any method may be employed by host bus adapter 54 to route data between host computer 12 and storage devices 18A–18B. Such routing of data may be implemented at the command level, the sequence level, or the frame level. When implemented at the command level, host bus adapter 54 may extract data from received frames, temporarily store the data, and forward the data when all of the data associated with the data transfer command has been received. When the routing of data by host bus adapter 54 is implemented at the sequence level, host bus adapter 54 may extract data from received frames, temporarily store the data, and forward the data when all of the data associated with a sequence of the data transfer command has been received.

Figure 8:
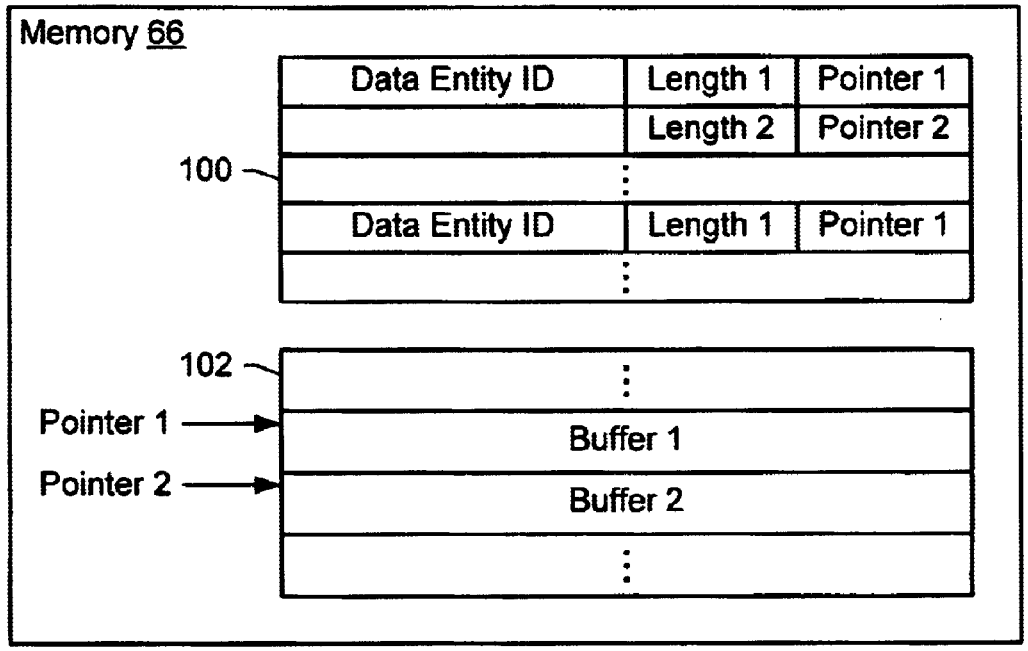
FIG. 8 is a block diagram of one embodiment of a memory of the host bus adapter of FIG. 6, wherein the memory includes a first lookup table and a buffer section.

FIG. 8 is a block diagram of one embodiment of memory 66 of host bus adapter 54 of FIG. 6. The embodiment of memory 66 of FIG. 8 may be used to implement the routing of data by host bus adapter 54 as described above at the command or sequence level. In the embodiment of FIG. 8, memory 66 includes a lookup table 100 and a buffer section 102. Lookup table 100 includes a number of entries. Each entry of lookup table 100 includes a data entity identification (ID) field, at least one length field, and at least one pointer field. The data entity identification field includes identification information which uniquely identifies a given data transfer entity. When the embodiment of memory 66 of FIG. 8 is used to implement data routing at the command level, the data entity is command data. When the embodiment of memory 66 of FIG. 8 is used to implement data routing at the sequence level, the data entity is sequence data. Each length field contains the length of a corresponding buffer within buffer section 102 assigned to one of the two storage devices 18 (e.g., storage device 18A). Each pointer field contains the base address of (i.e., a pointer to) the corresponding buffer.

For example, a first entry in lookup table 100 of FIG. 8 includes a length 1 field, a pointer 1 field, a length 2 field, and a pointer 2 field. The length 1 field contains the length of a first buffer (buffer 1) within buffer section 102 assigned to one of the two storage devices 18 (e.g., storage device 18A). The pointer 1 field contains the base address of (i.e., a pointer to) the first buffer. The length 2 field contains the length of a second buffer (buffer 2) within buffer section 102 assigned to the other storage device 18 (e.g., storage device 18B). The pointer 2 field contains the base address of (i.e., a pointer to) the second buffer.

When the embodiment of memory 66 of FIG. 8 is used to implement data routing at the command level, each entry of lookup table 100 corresponds to a different data transfer command, and the data entity identification information of each entry uniquely identifies the corresponding data transfer command. The data entity identification information includes command identification information. The command identification information may be, for example, a symbol or value assigned to the data transfer command by host computer 12 and conveyed to storage controller 36 as part of the data transfer command.

Alternately, storage controller 36 may generate the command identification information in response to the data transfer command, and may forward the command identification information to host bus adapter 54. For example, storage controller 36 may maintain a list of numbers, and may assign a number not currently in use to each data transfer command received from host computer 12. Storage controller 36 may forward the number to host bus adapter 54. When a number is assigned to a data transfer command, the number is considered in use until the data transfer command is completed.

When the embodiment of memory 66 of FIG. 8 is used to implement data routing at the sequence level, each entry of lookup table 100 corresponds to a different sequence of a data transfer command, and the data entity identification information of each entry uniquely identifies a corresponding sequence. The data entity identification information includes sequence identification information and/or the command identification information described above. The sequence identification information may be, for example, a symbol or value generated by host bus adapter 54.

When data routing by host bus adapter 54 is implemented at the command or sequence level and storage controller 36 receives a data transfer command from host computer 12, storage controller 36 generates the one or more translated data transfer commands and lookup table 100 entry information associated with the data transfer command. The lookup table 100 entry information includes data entity identification information and the values for the length and pointer fields of lookup table 100 entries associated with the data transfer. Storage controller 36 forwards the one or more translated data transfer commands and the lookup table 100 entry information to host bus adapter 54. Control unit 64 of host bus adapter 54 may store the lookup table 100 entry information within memory 66.

When receive unit 70 receives data frames of the data transfer command via loop 34 (FIG. 3) or link 46B (FIG. 4), receive unit 70 extracts the data from the frames. Control unit 64 may forward the data from receive unit 70 to one or more buffers within buffer section 102 of memory 66 according to the contents of lookup table 100. For example, buffer 1 in FIG. 8 may be assigned to storage device 18A, and buffer 2 may be assigned to storage device 18B. Control unit 64 may use the contents of the pointer 1 and/or length 1 fields of a lookup table 100 entry to access buffer 1, and may use the contents of the pointer 2 and/or length 2 fields of the lookup table 100 entry to access buffer 2.

When the data of an entire data entity is stored within one or more buffers of memory 66, control unit 64 transfers the data to transmit unit 68 via adapter bus 62. Transmit unit 68 packetizes the data and transmits the frames 80 of the one or more packets upon loop 34 (FIG. 3) or link 46B (FIG. 4). As a result, data is transferred between host computer 12 and storage devices 18A–18B through storage controller 36 such that the data is not conveyed upon controller bus 56 or stored within memory 52. It is noted that the data transfer rate of adapter bus 62 is much higher than the data transfer rate of controller bus 56. In addition, this data transfer mechanism does not rely upon availability of controller bus 56 and/or CPUs 50A–50B. As described above, this mechanism allows independent scalability of the IOPS and data transfer rate of storage system 32 (FIG. 3) and storage system 42 (FIG. 4).

Figure 9:
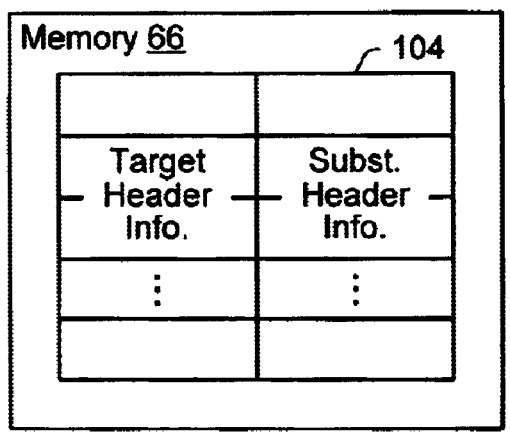
FIG. 9 is a block diagram of an alternate embodiment of the memory of FIG. 8, wherein the memory includes a second lookup table.

FIG. 9 is a block diagram of an alternate embodiment of memory 66 of host bus adapter 54 of FIG. 6. The embodiment of memory 66 of FIG. 9 may be used to implement the routing of data by host bus adapter 54 as described above at the frame level. As described above, a packet is transmitted as one or more frames under the Fibre Channel standard. In the embodiment of FIG. 9, memory 66 includes a lookup table 104. Lookup table 104 includes target header information and corresponding substitute header information.

When data routing by host bus adapter 54 is implemented at the frame level and storage controller 36 receives a data transfer command from host computer 12, storage controller 36 generates the one or more translated data transfer commands and frame header substitution information associated with the data transfer. The frame header substitution information includes target header information and corresponding substitute header information. The target header information includes at least a portion of header field 82 of a frame 80 conveying data and expected to be received by receive unit 70 of host bus adapter 54 during the data transfer. The substitute header information includes header information to be substituted by receive unit 70 for header information of a received frame if the header information matches the target header information. Storage controller 36 provides the one or more translated data transfer commands and the frame header substitution information to host bus adapter 54. Control unit 64 of host bus adapter 54 may store the frame header substitution information within memory 66.

A frame 80 of the data transfer received by receive unit 70 via loop 34 (FIG. 3) or link 46B (FIG. 4) is temporarily stored within input buffer 74. While the frame 80 is stored within input buffer 74, control unit 64 compares the contents of header field 82 of the frame 80 to target header information stored within lookup table 104. If the contents of header field 82 of the frame 80 matches target header information stored within lookup table 104, control unit 64 replaces the contents of header field 82 of the frame 80 with the substitute header information corresponding to the target header information within lookup table 104. Control unit 64 may also recalculate the CRC value within CRC field 84 of the frame 80.

Control unit 64 transfers the modified frame 80 from input buffer 74 of receive unit 70 to output buffer 72 of transmit unit 68 via adapter bus 62, and directs transmit unit 68 to transmit the modified frame 80 upon loop 34 (FIG. 3) or link 46B (FIG. 4). As a result, data is transferred between host computer 12 and storage devices 18A–18B through storage controller 36 such that the data is not conveyed upon controller bus 56 or stored within memory 52. As noted above, the data transfer rate of adapter bus 62 is much higher than the data transfer rate of controller bus 56. The described data transfer mechanism does not rely upon availability of controller bus 56 and/or CPUs 50A–50B, and allows independent scalability of the IOPS and data transfer rate of storage system 32 (FIG. 3) and storage system 42 (FIG. 4).

Figure 10A:
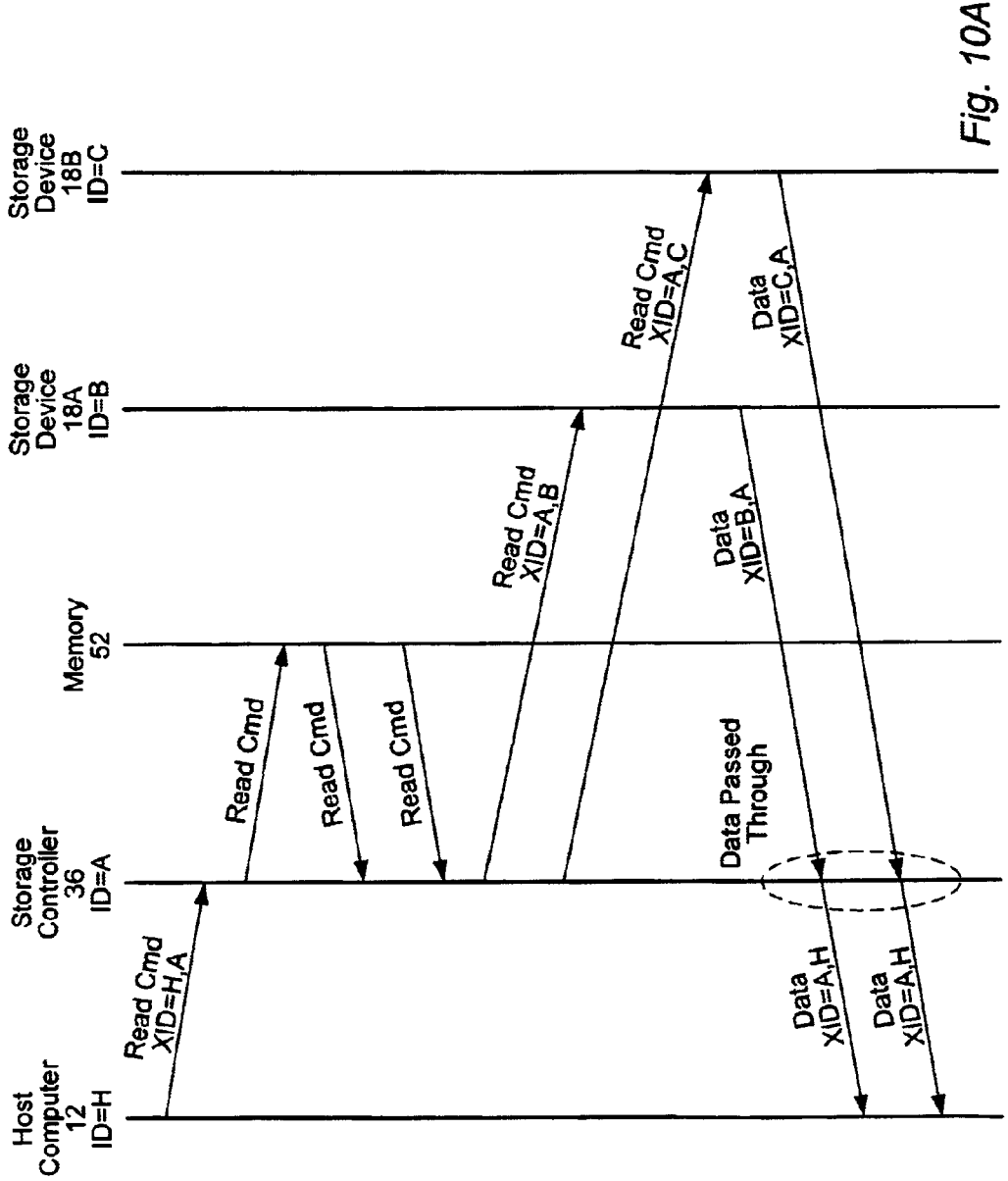

FIGS. 10A–B illustrate an exemplary flow of control and data packets during a data read operation initiated by host computer 12 of computer system 30 (FIG. 3) or computer system 40 (FIG. 4). Communications within computer system 30 (FIG. 3) and computer system 40 (FIG. 4) are assumed to comply with the Fibre Channel standard, and single packet data transfers are assumed hereinbelow for simplicity. Referring first to FIG. 7A in conjunction with FIGS. 3–6, 7A–B, and 8–9, host computer 12 transmits a read command packet identifying storage controller 36 as its destination (XID=H,A). In FIG. 3, host computer transmits the read command packet via loop 34. In FIG. 4, host computer transmits the read command packet via link 46A, and switch 44 routes the read command packet to storage controller 36 via link 46B.

Receive unit 70 of host bus adapter 54 receives the read command packet and extracts the read command from the read command packet. Control unit 64 of host bus adapter 54 may transfer the read command from receive unit 70 to memory 52 of storage controller 36 via BIU 60 and controller bus 56. CPU 50A and/or CPU 50B accesses the read command within memory 52 and translates the read command as described above, producing two separate translated read commands to obtain the data requested by host computer 12. A first translated read command obtains data from storage device 18A, and the second translated read command obtains data from storage device 18B. Each of the translated read commands instructs respective storage devices 18A–18B to access and provide data identified by the translated read command. CPU 50A and/or CPU 50B also generates lookup table 100 entry information (FIG. 8) or frame header substitution information for lookup table 104 (FIG. 9) as described above.

CPU 50A and/or CPU 50B forwards the first and second translated read commands, lookup table 100 entry information (FIG. 8), and/or frame header substitution information for lookup table 104 (FIG. 9) to host bus adapter 54. Transmit unit 68 of host bus adapter 54 packetizes the first translated read command and transmits the first translated read command packet to storage device 18A (XID=A,B) via loop 34 (FIG. 3) or link 46B (FIG. 4). Transmit unit 68 of host bus adapter 54 packetizes the second translated read command and transmits the second translated read command packet to storage device 18B (XID=A,C) via loop 34 (FIG. 3) or link 46B (FIG. 4). In FIG. 4, switch 44 routes the first translated read command packet to storage device 18A, and routes the second translated read command packet to storage device 18B.

Storage device 18A receives the first translated read command packet, accesses the requested data, and transmits a first data packet including the requested data to storage controller 36 (XID=B,A). Similarly, storage device 18B receives the second translated read command packet, accesses the requested data, and transmits a second data packet including the requested data to storage controller 36 (XID=C,A). Storage devices 18A–18B also generate status packets relaying the status of the read operations. The flow of data packets will be described first, followed by a description of the flow of status packets. In FIG. 4, switch 44 routes the first and second data packets to storage controller 36.

Receive unit 70 of host bus adapter 54 receives the first and second data packets via loop 34 (FIG. 3) or link 46B (FIG. 4). Host bus adapter 54 uses information within lookup table 100 (FIG. 8) or lookup table 104 (FIG. 9) to route the data between receive unit 70 and transmit unit 68 using any one of the methods described above. Transmit unit 68 transmits the data from storage device 18A as a first data packet identifying host computer 12 as its destination (XID=A,H), and transmits the data from storage device 18B as a second data packet identifying host computer 12 as its destination (XID=A,H). As noted above, data is transferred from storage devices 18A–18B to host computer 12 through storage controller 36 such that the data is not conveyed upon controller bus 56 or stored within memory 52 of storage controller 36.

Referring now to FIG. 10B in conjunction with FIGS. 3–6, 7A–B, and 8–9, the flow of status packets will now be described. Storage device 18A transmits a first status packet to storage controller 36 (XID=B,A). Similarly, storage device 18B transmits a second status packet to storage controller 36 (XID=C,A). In FIG. 4, switch 44 routes the first and second status packets to storage controller 36.

Receive unit 70 of host bus adapter 54 receives the first and second status packets and extracts first and second status information from the respective first and second status packets. Control unit 64 of host bus adapter 54 may transfer the first and second status information to memory 52 of storage controller 36 via BIU 60 and controller bus 56. CPU 50A and/or CPU 50B accesses the first and second status information and combines the first and second status information to form a composite status. CPU 50A and/or CPU 50B forwards the composite status to host bus adapter 54. Transmit unit 68 of host bus adapter 54 packetizes the composite status and transmits the resulting composite status packet to host computer 12 (XID=S,H) via loop 34 (FIG. 3) or link 46B (FIG. 4).). In FIG. 4, switch 44 routes the composite status packet to host computer 12.

Numerous variations and modifications will become apparent to those skilled in the art once the above disclosure is fully appreciated. It is intended that the following claims be interpreted to embrace all such variations and modifications.

What is claimed is:

1. A storage controller, comprising:

a controller bus;

a controller memory coupled to the controller bus;

at least one central processing unit (CPU) coupled to the controller bus and configured to produce data routing information dependent upon a data transfer command; and a host bus adapter coupled to the controller bus comprising a receive unit and a transmit unit adapted for coupling to a transmission medium, wherein the host bus adapter is coupled to receive the data routing information and configured to forward data associated with the data transfer command from the receive unit to the transmit unit dependent upon the data routing information and independent of the controller bus and the controller memory.

2. The storage controller as recited in claim 1, wherein the host bus adapter is configured to receive the data transfer command via the transmission medium and the receive unit and to store the data transfer command within the controller memory.

3. The storage controller as recited in claim 2, wherein the at least one CPU is configured to access the data transfer command within the controller memory in order to produce the data routing information.

4. The storage controller as recited in claim 3, wherein the data transfer command directs a transfer of data between a host computer and at least one storage device, and wherein the controller memory stores configuration information of the at least one storage device.

5. The storage controller as recited in claim 4, wherein the at least one CPU is configured access the configuration information of the at least one storage device within the controller memory and to translate the data transfer command dependent upon the data transfer command and the configuration information of the at least one storage device, thereby producing at least one translated data transfer command.

6. The storage controller as recited in claim 5, wherein the at least one CPU is configured to forward the at least one translated data transfer command to the host bus adapter, and wherein the host bus adapter is configured to transmit the at least one translated data transfer command upon the transmission medium via the transmit unit.

7. The storage controller as recited in claim 1, wherein the host bus adapter comprises a host bus adapter memory, and wherein the host bus adapter is configured to store the data routing information within the host bus adapter memory.

8. The storage controller as recited in claim 7, wherein the host bus adapter memory comprises a lookup table and a data buffer area, and wherein the data routing information comprises command identification information uniquely identifying the data transfer command and a pointer to a data buffer within the data buffer area, and wherein the command identification information and the pointer are stored within the lookup table.

9. The storage controller as recited in claim 8, wherein the host bus adapter is configured to store at least a portion of the data associated with the data transfer command within the data buffer using the pointer, and to forward the data from the data buffer to the transmit unit when all of the data associated with the data transfer command has been received by the host bus adapter.

10. The storage controller as recited in claim 7, wherein the host bus adapter memory comprises a lookup table, and wherein the data routing information comprises target header information and corresponding substitute header information, and wherein the target header information includes at least a portion of a header field of an expected data frame, and wherein the substitute header information includes header information to be substituted by the receive unit for the header information of the expected data frame, and wherein the target header information and corresponding substitute header information are stored within the lookup table.

11. The storage controller as recited in claim 10, wherein the host bus adapter is configured to: (i) compare header information of a received data frame to the target header information within the lookup table, (ii) replace the header information of the received data frame with the substitute header information corresponding to the target header information if the header information of the received data frame matches the target header information, and (iii) forward the received data frame from the receive unit to the transmit unit.

12. A storage system, comprising:
at least one storage device;
a storage controller, comprising:
a controller bus;
a controller memory coupled to the controller bus;
a host bus adapter comprising a receive unit and a transmit unit, wherein the host bus adapter is coupled to the at least one storage device, to the controller bus, and coupled to receive a data transfer command, and wherein the host bus adapter is configured to: (i) store the data transfer command within the controller memory, (ii) receive data routing information and store the data routing information within a host bus adapter memory, and (iii) forward data associated with the data transfer command from the receive unit to the transmit unit dependent upon the data routing information and independent of the controller bus and the controller memory; and
at least one central processing unit (CPU) coupled to the controller bus and configured to access the data transfer command within the controller memory and to produce the data routing information dependent upon the data transfer command.

13. The storage system as recited in claim 12, wherein the data transfer command directs a transfer of data between a host computer and the at least one storage device, and wherein the controller memory stores configuration information of the at least one storage device.

14. The storage system as recited in claim 13, wherein the at least one CPU is configured to translate the data transfer command dependent upon the data transfer command an the configuration information of the at least one storage device, thereby producing at least one translated data transfer command.

15. The storage system as recited in claim 14, wherein the at least one storage device comprises a plurality of disk drives, and wherein the storage controller manages the at least one storage device as a redundant array of independent disks (RAID) array, and wherein the configuration information of the at least one storage device includes RAID array configuration information of the at least one storage device.

16. The storage system as recited in claim 14, wherein the at least one CPU is configured to forward the at least one translated data transfer command to the host bus adapter, and wherein the host bus adapter is configured to transmit the at least one translated data transfer command to the at least one storage device.

17. A computer system, comprising:
a host computer;
at least one storage device;
a transmission medium coupled to the host computer and the at least one storage device;
a storage controller, comprising:
a controller bus;
a controller memory coupled to the controller bus;
a host bus adapter comprising a receive unit and a transmit unit coupled to the transmission medium, wherein the host bus adapter is coupled to the controller bus, and wherein the host bus adapter is configured to: (i) receive a data transfer command from the host computer and store the data transfer command within the controller memory, (ii) receive data routing information and to store the data routing information within a host bus adapter memory, and (iii) forward data associated with the data transfer command from the receive unit to the transmit unit dependent upon the data routing information and independent of the controller bus and the controller memory; and
at least one central processing unit (CPU) coupled to the controller bus and configured to access the data transfer command within the controller memory and to produce the data routing information dependent upon the data transfer command.

18. The storage system as recited in claim 17, wherein the host computer is configured to produce the data transfer command in order to effect a transfer of data between the host computer and the at least one storage device, and wherein the controller memory stores configuration information of the at least one storage device.

19. The storage system as recited in claim 18, wherein the at least one CPU is configured to translate the data transfer command dependent upon the data transfer command and the configuration information of the at least one storage device, thereby producing at least one translated data transfer command.

20. The storage system as recited in claim 19, wherein the at least one storage device comprises a plurality of disk drives, and wherein the storage controller manages the at least one storage device as a redundant array of independent disks (RAID) array, and wherein the configuration information of the at least one storage device includes RAID array configuration information of the at least one storage device.

21. A method for conveying data within a storage system, comprising:
providing a storage controller comprising a host bus adapter and a controller memory coupled to a controller bus, wherein the host bus adapter comprises a receive unit, a transmit unit, and a host bus adapter memory;

coupling the receive and transmit units of the host bus adapter to a host computer and at least one storage device;

receiving a data transfer command from the host computer;

generating data routing information within the storage controller dependent upon the data transfer command;

storing the data routing information within the host bus adapter memory; and forwarding data associated with the data transfer command from the receive unit to the transmit unit of the host bus adapter dependent upon the data routing information and independent of the controller bus and the controller memory.

22. In a storage system comprising a storage controller, wherein the storage controller comprises a command processor and a host adapter coupled together by a controller bus, a method for conveying data within the storage system, comprising:

the host adapter receiving a data transfer command from a host computer coupled to the host adapter;

the host adapter conveying the data transfer command to the command processor on the controller bus;

the command processor generating data routing information dependent upon the data transfer command, and conveying the data routing information to the host adapter on the controller bus;

the host adapter receiving data for the data transfer command from one or more storage devices and forwarding the data to the host computer so that the data is conveyed from the one or more storage devices to the host computer without being conveyed on the controller bus or to the command processor.

23. In a storage system comprising a storage controller, wherein the storage controller comprises a command processor and a host adapter coupled together by a controller bus, a method for conveying data within the storage system, comprising:

the host adapter receiving a data transfer command from a host computer coupled to the host adapter;

the host adapter conveying the data transfer command to the command processor on the controller bus;

the command processor translating the data transfer command into one or more device data transfer commands, and conveying the device data transfer commands to the host adapter on the controller bus;

the host adapter forwarding the device data transfer commands to one or more storage devices; and the host adapter receiving data in response to the device data transfer commands and forwarding the data to the host computer so that the data is conveyed from the one or more storage devices to the host computer without being conveyed on the controller bus or to the command processor.

* * * * *